J. HENDERSON.
Shovel-Plow.

No. 23,171.

Patented Mar. 8, 1859.

Witnesses:
J. A. P. Campbell
William Fuller

Inventor:
John Henderson

UNITED STATES PATENT OFFICE.

JOHN HENDERSON, OF BLUFF SPRINGS, MISSISSIPPI.

IMPROVEMENT IN COTTON-SCRAPERS.

Specification forming part of Letters Patent No. 23,171, dated March 8, 1859.

*To all whom it may concern:*

Be it known that I, JOHN HENDERSON, of Bluff Springs, Attala county, in the State of Mississippi, have invented a new and useful Double-Winged Cotton-Scraper; and I do hereby declare that the following is a full, clear, and exact description of the construction and operation of the same, reference being had to the annexed drawings, making a part of this specification, in which—

Figure 1:
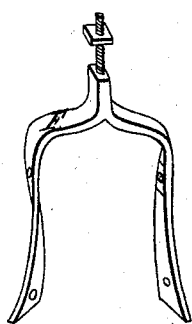
Figure 2:
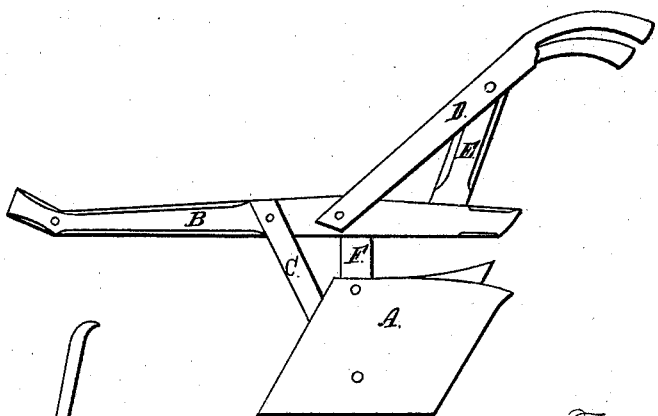
Figure 3:
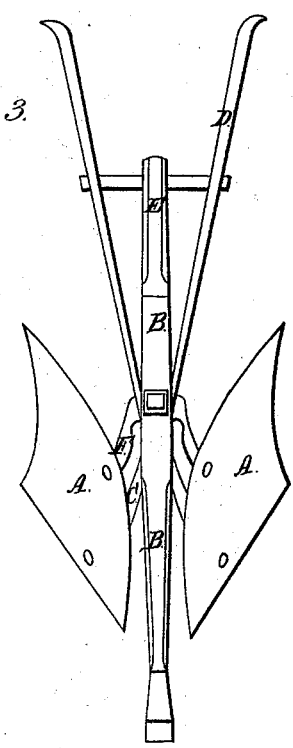
Figure 4:
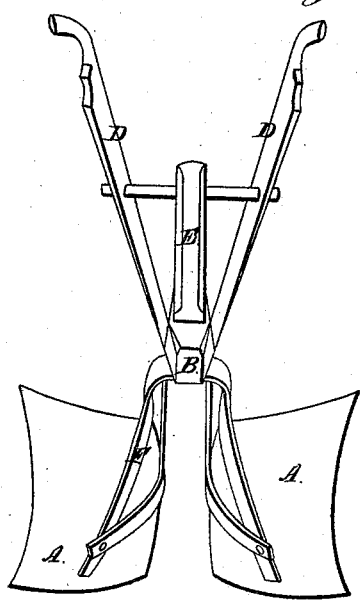

Figure 1 is a representation of the bar to which the wings are attached. Fig. 2 is a side view of the scraper. Fig. 3 is a front view, and Fig. 4 is a back view.

Letter A represents the wings; B, the beam; C, the brace-bar; D, the handles, and E the upright piece between the handles; and F, the bar to which the wings are attached, running through the beam.

The length of the beam is four feet. Its depth at the point where F (the bar to which the wings are attached) passes through is four inches, and its thickness three and a half inches, perfectly straight on the bottom and slightly tapered on sides and top to front. F passes through the beam sixteen inches from the back end of beam and is fastened on top by a tap. The length of E (upright piece) is two feet and eight inches, or of sufficient length to make the handles high enough for the person using the implement, and runs through the beam four inches from back end of beam. The handles are made as ordinary plow-handles, of size and shape to suit the taste of the manufacturer.

The bar to which the wings are attached, as represented by Fig. 1, consists of a bar of iron five-eighths of an inch thick, by one and three-fourth inches wide and thirty-two inches long, bent double in the middle, and welded for a space of three and a half inches from the middle. The part thus welded passes through the beam and is fastened on top of beam by a tap, as represented in Fig. 1. The ends of the bar are bent so as to form right angles just under the beam opposite each other at a distance of nine inches apart, as represented in Fig. 1. The front edge of the bar is twisted, so as to bring the points of the wings within four and a half inches of each other, as represented in Fig. 3, and the heels of the wings twenty-four inches apart, as represented in Fig. 3.

The wings consist of slab-iron, one-fourth of an inch thick by nine inches in width, cut nearly in the shape of diamonds, as represented by A in Fig. 2, and to be thirteen inches on the lower edge, which is laid with steel and slightly turned up. The front edge of wings is also slightly turned out. The top edge of wings is fourteen inches in length. The wings are attached to the bar by two bolts, one at the lower edge and the other at the upper edge of each, so as to bring the points of the wings, as represented in Fig. 2, within thirteen and a half inches of the beam, measured perpendicularly.

The brace-bar (represented in Fig. 2 by letter C) consists of a bar of iron one-fourth of an inch thick and one-half inch wide, and is attached to the wings by the lower bolts, which pass through both brace and bar, and thence runs to the beam, and is fastened to its sides eight inches in front of point where F (the bar) passes through the beam by a bolt.

The dimensions above given are those I have found best in practice; but they may be varied according to the strength and weight required.

The double-winged cotton-scraper is drawn by one horse and scrapes both sides of the row at the same time and by the same movement, thus doing with one horse and hand the work of two horses and two hands, and at the same time dispensing with the usual mode of barring off and so effectually cleaning the row as that the labor of afterward hoeing is lessened one-third from the usual mode of scraping. It is designed to be used in the culture of both corn and cotton, and is equally well adapted to both.

What I claim as my invention, and desire to secure by Letters Patent, is—

The forked bar F and brace-bar C, in combination with the beam B and wings A of a double-winged cotton-scraper, when constructed and arranged in the manner set forth.

JOHN HENDERSON.

Attest:
 J. K. COFFEY,
 W. J. SALLIS.